United States Patent [19]

Kataoka

[11] 4,377,276
[45] Mar. 22, 1983

[54] SELF-PROPELLING BEVEL FUSION-CUTTING MACHINE

[75] Inventor: Hiroshi Kataoka, Takarazuka, Japan

[73] Assignee: Koei Machine Co., Ltd., Osaka, Japan

[21] Appl. No.: 326,000

[22] Filed: Nov. 30, 1981

[30] Foreign Application Priority Data

Aug. 31, 1981 [JP] Japan .............................. 56-137208

[51] Int. Cl.³ .............................................. B23K 7/04
[52] U.S. Cl. ..................................................... 266/56
[58] Field of Search .................................... 266/54, 56

[56] References Cited

U.S. PATENT DOCUMENTS 3,501,872  3/1970  Mighton ............................... 266/56

Primary Examiner—W. Stallard
Attorney, Agent, or Firm—Wenderoth, Lind & Ponack

[57] ABSTRACT

A self-propelling bevel fusion-cutting machine for beveling pipes comprises a machine main body which holds a fusion-cutter, such as a burner, for effecting the bevel fusion-cutting of the end face of a pipe, traveling guide rollers which roll on the pipe end face, and outer roller which rolls circumferentially on the outer peripheral surface of the pipe, and an inner roller which rolls circumferentially on the inner peripheral surface of the pipe. The machine main body is movable along the pipe end face by means of these rollers. The outer or inner roller is removably pressed against the peripheral surface of the pipe and this roller or the other roller is connected to a drive source mounted on the machine main body so as to be thereby driven for rotation. The axis of rotation of the rotatably driven roller is inclined along the movement direction of the machine main body, so that with rotation of the driven roller the machine main body is capable of moving circumferentially along the pipe end face while holding the traveling guide roller in intimate contact with the pipe end face.

1 Claim, 4 Drawing Figures

SELF-PROPELLING BEVEL FUSION-CUTTING MACHINE

BACKGROUND OF THE INVENTION

The present invention relates to a self-propelling bevel fusion-cutting machine for beveling pipes by fusion-cutter.

As for edge preparation machines of this type, the so-called rotary edge preparation machine is popular which comprises a base adapted to be fixed in position inside a pipe to be processed, a turntable mounted on said base, and a fusion-cutter such as a burner. However, such conventional edge preparation machine has the following drawbacks.

First, because of the base required besides the fusion-cutter for supporting the latter, the overall weight of the machine correspondingly increases inconvenience for handling. Particularly, fixed installing the base inside a pipe takes much time and labor because of its substantial weight. Secondly, in the case of the rotary edge preparation machine the limited length of the arm which supports the fusion-cutter limits the range of change of the radius of rotation of the fusion-cutter, so that covering the whole range of pipe diameters necessitates providing various sizes of edge preparation machines in accordance with pipe diameters. As a result, the economic burden increases. Thirdly, in cases where the pipe is other than round, e.g., square, the processing of the corners and straight portion requires different radii of rotation of the fusion-cutter. In this case, if the rotative speed of the turntable is constant, the peripheral speed of the fusion-cutter is high relative to the pipe corners and low relative to the straight portions, which means that the straight portions can be fusion-cut but the corners cannot. In order to avoid such situation, special measures must be taken to decrease the rotative speed of the fusion-cutter when its radius of rotation increases, thus making the machine complicated in arrangement and, moreover, adding to the weight. Further, with an other than round, e.g., square pipe, it oftens happens that the direction of the flame emitted from the fusion-cutter is not at a constant angle with the tangential direction of the pipe periphery. As a result, it is difficult to attain a uniform quality of fusion-cut.

SUMMARY OF THE INVENTION

The invention provides a improved self-propelling bevel fusion-cutting machine which eliminates all these drawbacks of the conventional edge preparation machine and which is light in weight, applicable to all sizes of pipes and capable of uniform bevel fusion-cutting throughout the end face of a pipe whose cross-sectional shape is round or otherwise, e.g., square.

A self-propelling bevel fusion-cutting machine according to the invention is characterized by comprising a machine main body which holds a fusion-cutter for effective the bevel fusion-cutting of the end face of a pipe, traveling guide rollers which roll on said pipe end faces, an outer roller which rolls circumferentially on the outer peripheral surface of the pipe, and an inner roller which rolls circumferentially on the inner peripheral surface of the pipe, the arrangement being such that the machine main body is movable circumferentially along the pipe end face by means of said rollers, either said outer roller or said inner roller being arranged so that it can be urged against and moved away from the peripheral surface of the pipe, said roller or the other roller being connected to a drive surce mounted on said machine main body so as to be thereby driven for rotation, the axis of rotation of said rotatably driven roller being inclined along the movement direction of said machine main body, with the result that with rotation of the driven roller the machine main body is capable of moving circumferentially along the pipe end face while holding the traveling guide roller in intimate contact with the pipe end face.

DETAILED DESCRIPTION OF THE PREFERRED EMBODIMENTS

Figure 1:
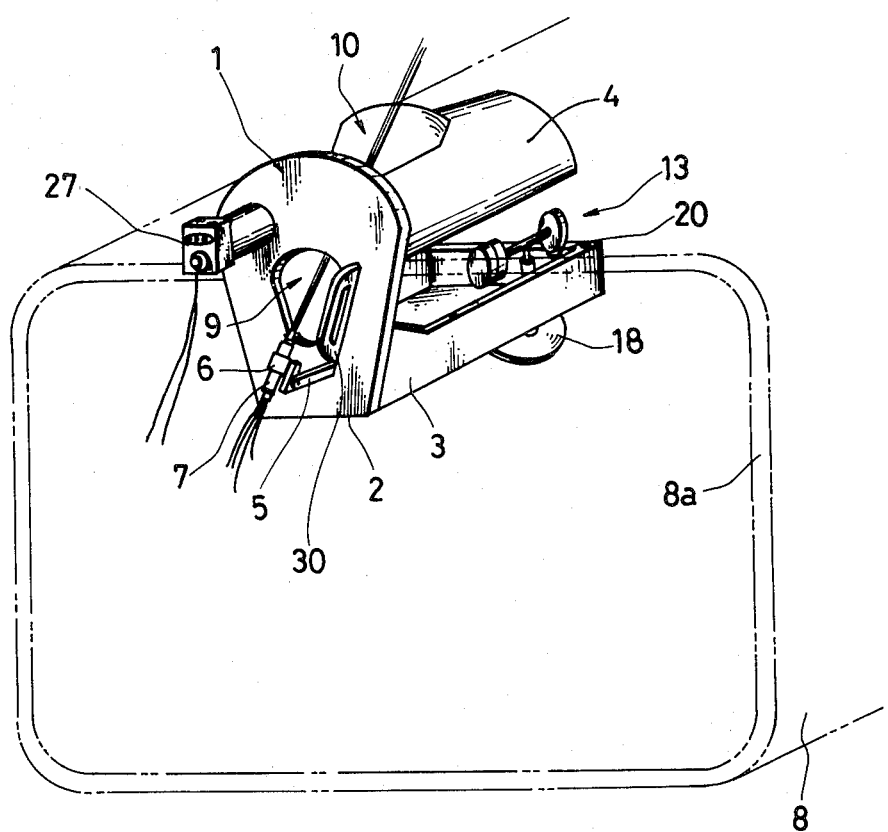
FIG. 1 is a schematic perspective view of an embodiment of the present invention.
Figure 2:
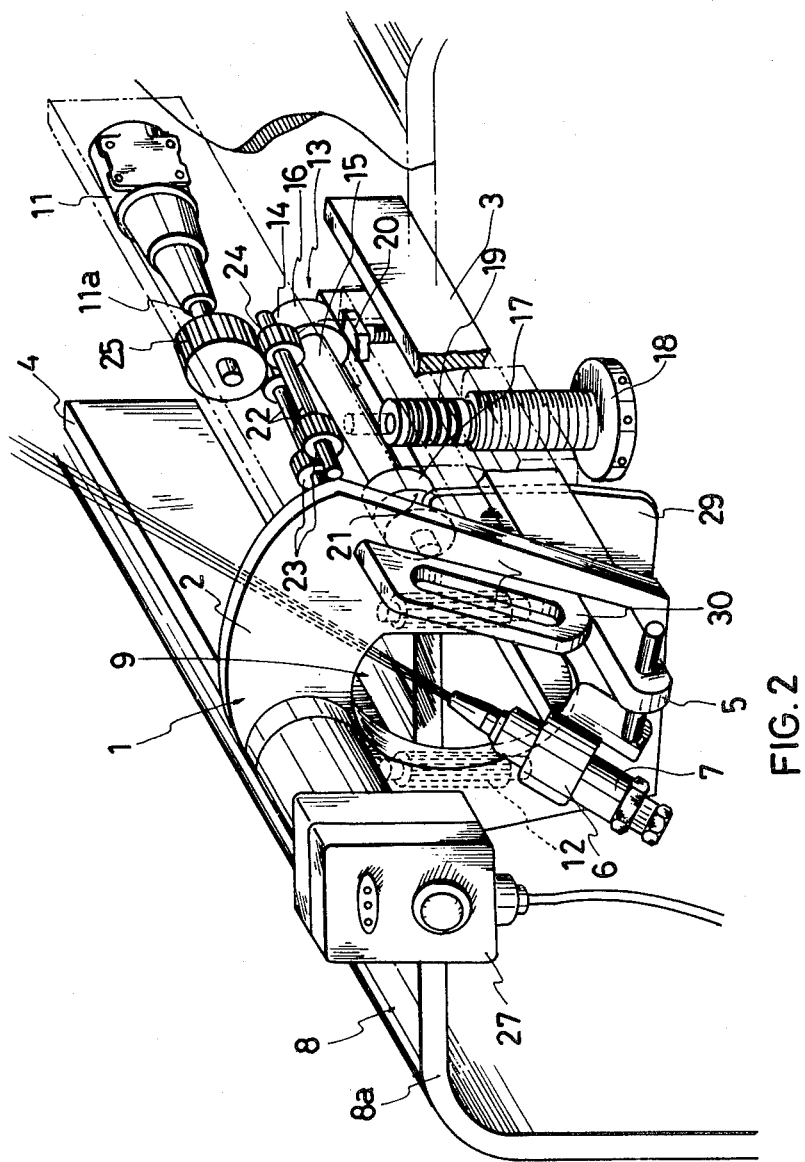
FIG. 2 is a perspective view, partly broken away, showing how the components of the invention are arranged and connected.
Figure 3:
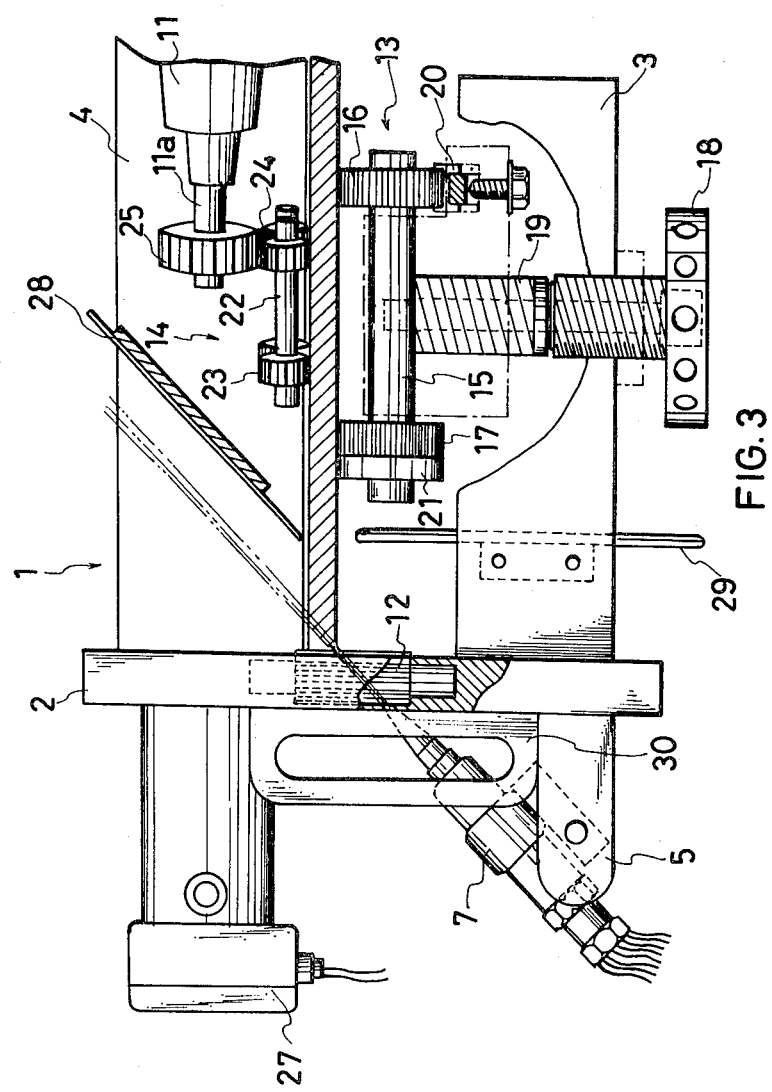
FIG. 3 is a side view, partly broken away, of the apparatus shown in FIG. 1.

A machine main body 1 comprises a base plate 2 formed of an aluminum casing, and a pair of casings 3 and 4 installed on the back of said base plate 2 in opposed relation to each other. The base plate 2 has a fusion-cutter support arm 5 projecting therefrom, said arm 5 supporting a fusion-cutter, e.g., a burner 7 by means of a rotary holder 6. The burner 7 is held in an inclined position to effect the so-called bevel fusion-cutting of the end face 8a of a pipe, as shown in FIG. 3. The base plate 2 located forwardly of the burner 7 is formed with an opening 10 for the flame to pass therethrough.

Mounted on the casing 4 is a DC motor 11 serving as a drive source for rotating a roller to be later described.

A pair of traveling guide rollers 12 which roll on the end face 8a of the pipe 8 are supported on said base plate 2 around the opening 9 therein. One casing 3 is provided with an inner roller 13 which rolls circumferentially on the inner peripheral surface of the pipe, while the other casing 4 is provided with an outer roller 14 which rolls circumferentially on the outer peripheral surface of the pipe. By means of these rollers 12, 13, and 14, the machine main body 1 is capable of moving circumferentially along the pipe end face 8a.

The inner roller 13 comprises ball bearings 16 and 17 supported on opposite ends of a single support shaft 15. The ball bearing may be replaced by simple rotatable rings. The support shaft 15 is slidable toward and away from the inner peripheral surface of the pipe 8 by means of a suitable mechanism. In the illustrated embodiment, a pressure-exerting tool 18 is screwed into the casing 3 to engage the support shaft 15. By turning the pressure-exerting tool 18 to move the support shaft 15 toward and away from the inner periphery of the pipe 8, the ball bearings 16 and 17 can be urged against or moved away from the inner peripheral surface of the pipe 8 so as to apply pressure to the ball bearings 16 and 17 or remove pressure therefrom. The removal of pressure is effected only when the machine main body 1 is attached to or detached from the pipe 8, and in normal operation condition, the ball bearings are maintained under pressure. The pressure-exerting tool 18 has a safety spring 19 fitted thereon. Of the bearings, the one 16 located remote from the end face 8a of the pipe is provided with a travel-direction control brake 20. The bearing 17 located nearer to the pipe end face 8a has a disk 21 fastened to the lateral surface thereof for protection against flames.

Figure 4:
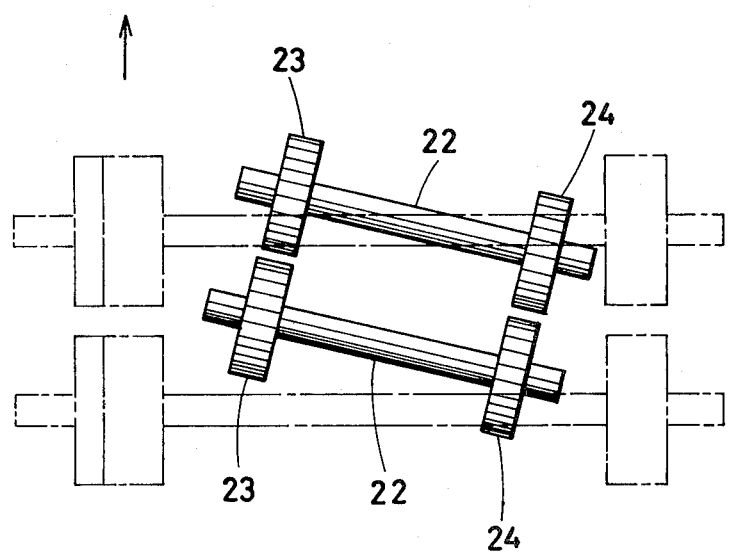
FIG. 4 is a view showing the principal portions of the inclined state of the axis of rotation of the outer roller.

The outer roller 14 comprises a pair of gears 23 and 24 fixed on opposite sides of a rotary shaft 22. The axis of rotation of the rotary shaft 22 is inclined along the movement direction of the machine main body 1. As shown in FIG. 4, the axis of rotation of the rotary shaft 22 is so inclined that the end of the rotary shaft 22 to which the gear 23 is fixed is positioned ahead of the other end of the rotary shaft 22 with respect to the movement direction of the machine main body 1, with the result that with rotation of the outer roller 14 the machine main body 1 is capable of moving circumferentially along the pipe end face 8a with the traveling guide rollers 12 being contacted intimately with the pipe end face 8a. Of the two gears 23 and 24, the one meshes with a drive gear 25 fixed to the rotary shaft 11a of a DC motor. Therefore, the outer roller, i.e., the pair of gears 23 and 24 are driven by the DC motor 11. The means for transmitting power from the drive source to the gears 23 and 24 is no limited to the illustrated gears transmission and may be chain alone. Further, in the illustrated embodiment the outer roller 14 comprises two gears fixed to the single rotary shaft, but the outer roller may comprises one wide roller and the number of gears constituting the outer roller may be more than three. In the drawings, 27 denotes an operating box for controlling the speed and rotative direction of said DC motor 11; 28 denotes a protective plate for protecting the outer roller 14 against the flame of the burner 7; and 29 denotes a protective plate for protecting the inner roller 13 against the flame, both protective plates being each formed of a stainless plate and a asbestos plate. The numeral 30 denotes a handle used to attach the machine main body 1 to the pipe 8 or detach it from the latter.

In operation, the pressure-exerting tool 18 is manipulated to press the inner roller 13 against the inner peripheral surface of the pipe 8 and then the DC motor 11 is energized, whereupon with the rotation of the outer roller 14, the machine main body 1 starts moving circumferentially along the pipe end face 8a. The rate of movement of the machine main body 1 is proportional to the rotative speed of the outer roller 14, i.e., the rotative speed of the DC motor. If, therefore, the rotative speed of the DC motor is constant, the rate of movement of the machine main body 1 is maintained constant at any position on the pipe end face 8a regardless of the shape of the pipe 8. Since the axis of the rotary shaft 22 of the outer roller 14 is inclined along the movement direction of the machine main body 1, the machine main body 1 is attracted to the center of the longitudinal direction of the peripheral surface of the pipe with rotation of the outer roller 14, with the result that the machine main body 1 moves at a constant speed along the pipe surface while holding the traveling guide rollers 12 in intimate contact with the pipe end face 8a. Because the machine main body 1 is of the self-propelling type moving along the pipe end face 8a, the direction of the flame emitted from the burner 7 is at right angle to the tangential direction of the peripheral surface of the pipe at any position on the pipe end face 8a. Therefore, satisfactory bevel fusion-cutting of the pipe end face 8a can be effected uniformly throughout the circumference thereof by the flame from the burner 7.

In addition, the above embodiment has been so arranged that the outer roller 14 is driven by the drive source 11, but of course it goes without saying that the inner roller 13 may be driven for rotation. In that case, the inner roller 13 may be arranged as in the outer roller 14 of the above embodiment. Further, with the casing 4 is provided a fan for cooling (not shown) to protect the outer roller 14 and the motor 11 from over-heating indirectly by the flame from the burner 7.

The self-propelling bevel fusion-cutting machine arranged in the manner described above according to the invention has the following merits.

(1) There is no need for separately providing a turntable as in the conventional rotary bevel fusion-cutting machine, so that the present machine is light in weight and easy handle.

(2) Since the machine is of the self-propelling type adapted to move along the end face of a pipe, it is very versatile, being applicable to all types of pipes irrespective of their size and thickness.

(3) Since the rate of movement of the machine main body can be maintained constant at any position on the pipe end face irrespective of the pipe shape by maintaining the rotative speed of the drive source constant, the machine is capable of uniform bevel fusion-cutting without leaving any portion uncut even if the pipe is other than round.

(4) Since the angle of the flame emitted from the fusion-cutter is constant with respect to the entire end face of the pipe, uniform bevel fusion-cutting can be effected, thus ensuring a constant bevel angle throughout the pipe end face.

It is to be understood that the invention is not limited to the exact details of construction, operation, or exact materials of the embodiments shown and described herein, as obvious modifications and equivalents will be apparent to one skilled in the art, and the invention is therefore to be limited only by the scope of the appended claim.

What is claimed is:

1. A self-propelling bevel fusion-cutting machine comprising a machine main body which holds a fusion-cutter for effecting the bevel fusion-cutting of the end face of a pipe, traveling guide rollers which roll on said pipe end face, an outer roller which rolls circumferentially on the outer peripheral surface of the pipe, and an inner roller which rolls circumferentially on the inner peripheral surface of the pipe, the arrangement being such that the machine main body is movable circumferentially along the pipe end face by means of said rollers, either said outer roller or said inner roller being arranged so that it can be urged against and moved away from the peripheral surface of the pipe, said roller or the other roller being connected to a drive source mounted on said machine main body so as to be thereby driven for rotation, the axis of rotation of said rotatably driven roller being inclined along the movement direction of said machine main body, with the result that with rotation of said rotatably driven roller, said machine main body is capable of moving circumferentially along said pipe end face while holding said traveling guide rollers in intimate contact with said pipe end face.

* * * * *